United States Patent Office 2,947,575
Patented Aug. 2, 1960

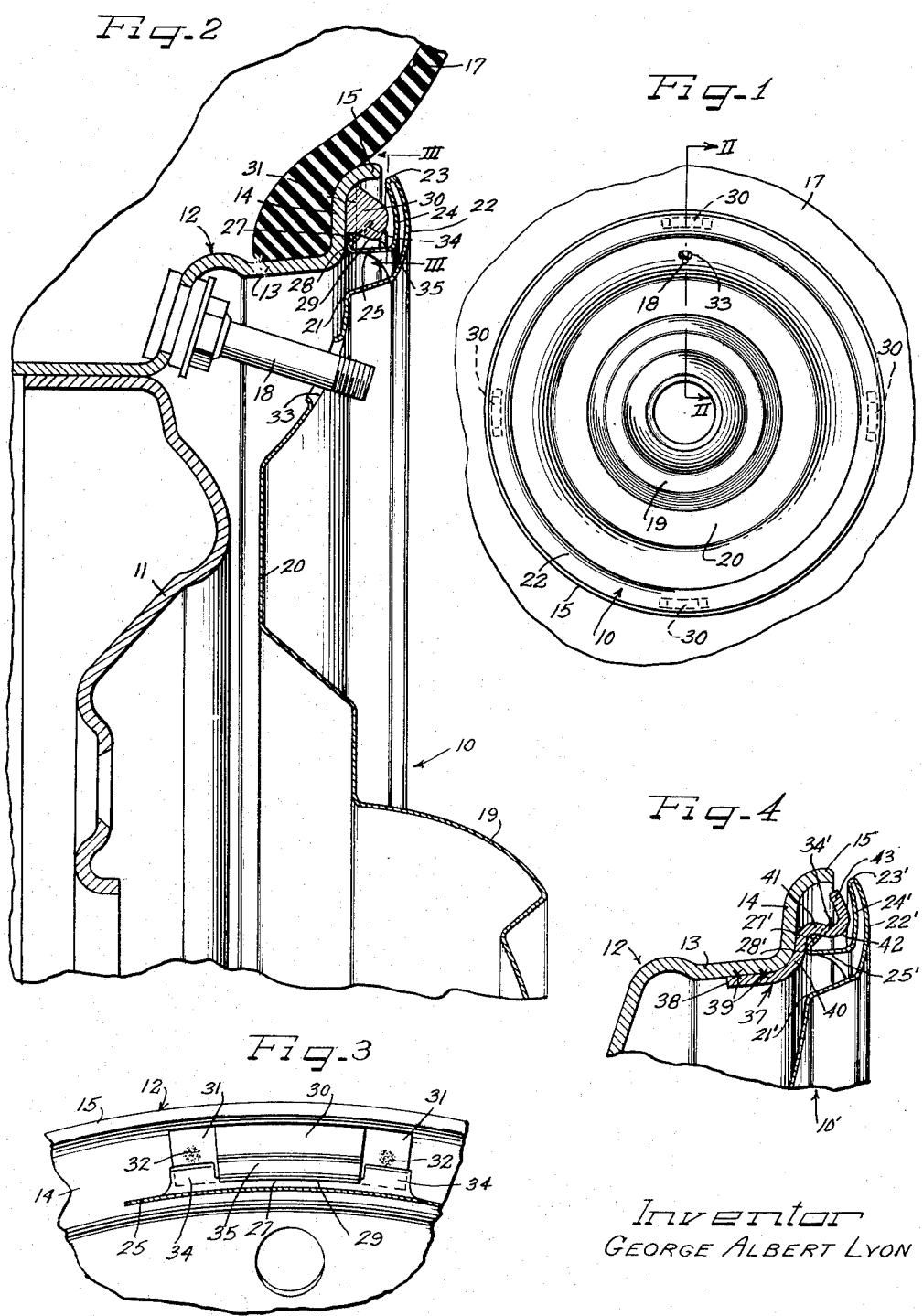

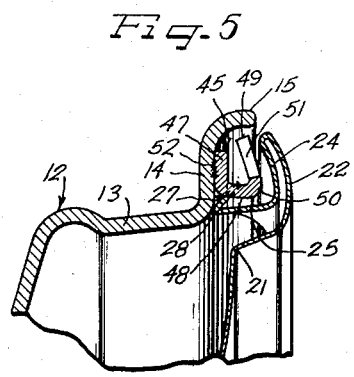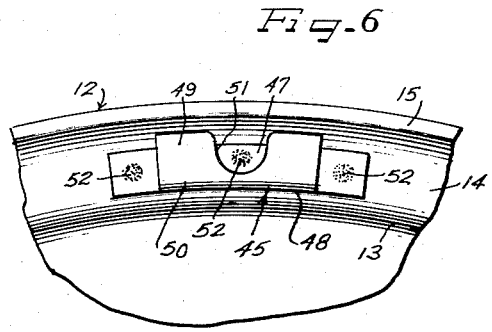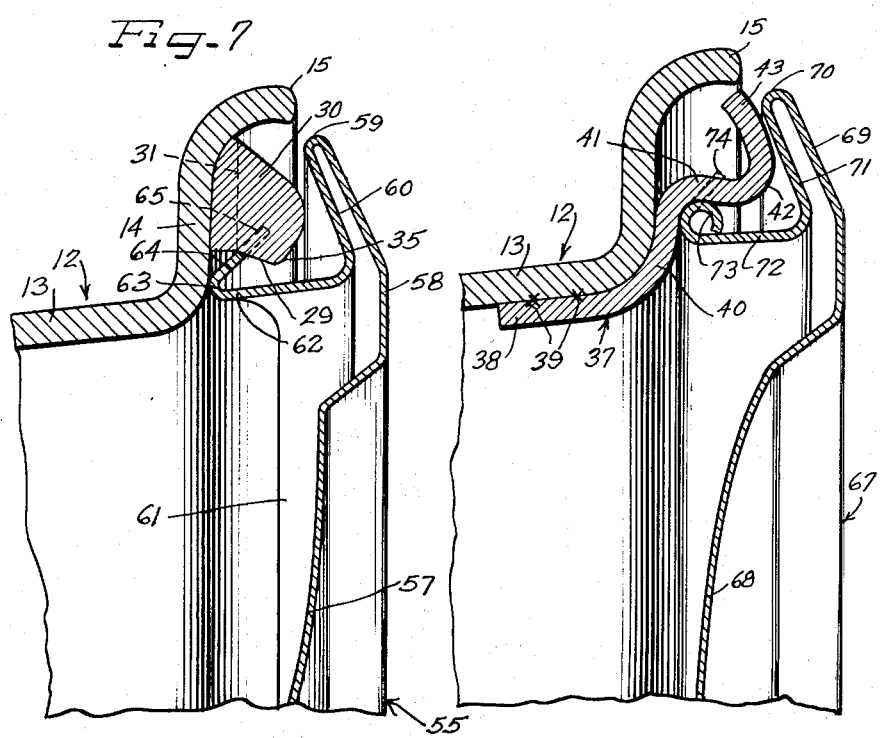

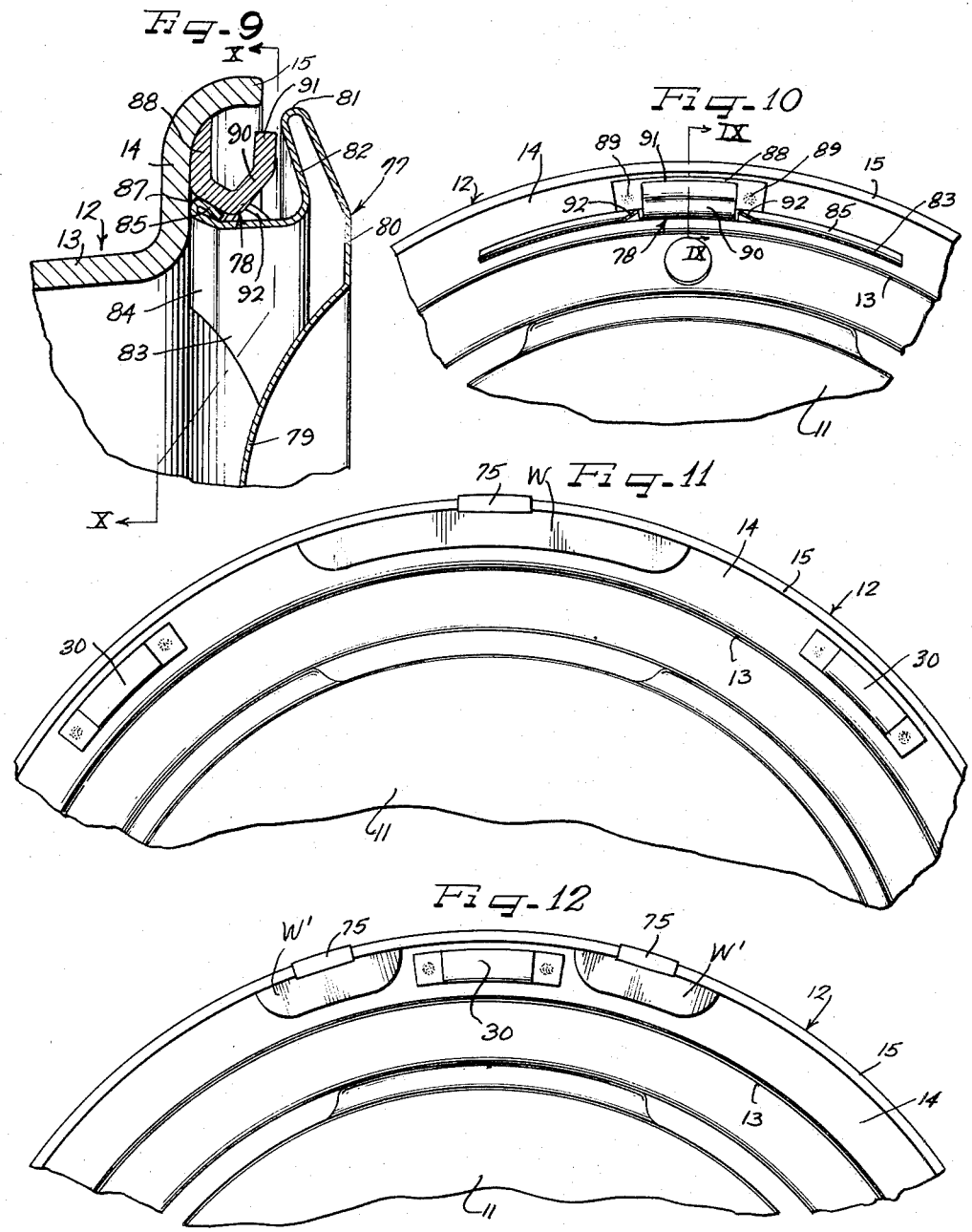

2,947,575
WHEEL COVER

George Albert Lyon, 13881 W. Chicago Blvd., Detroit 28, Mich.

Filed Apr. 15, 1957, Ser. No. 653,031

5 Claims. (Cl. 301—37)

The present invention relates to improvements in wheel structures and more particularly concerns the ornamental and protective covering of the outer sides of vehicle wheels.

This application is a continuation-in-part of my co-pending application Serial No. 641,926, filed February 25, 1957, now abandoned.

Although it is desirable to provide covers having retaining fingers that engage with the terminal flange of the tire rim, both from the standpoint of fully covering the outer side of the wheel and also for economy reasons since less material is required to provide the cover with retaining means than with other self-retaining finger expedients, a considerable problem is encountered in that room must be left for wheel balancing weights on the terminal flange. That is, balancing of the vehicle wheels is generally desirable, even though it is often neglected by the driving public, and the most convenient mode of effecting such balancing is to apply lead weights retained by clips in engagement with the terminal flange of the tire rim. At the outer side of the wheel the weights are applied for dynamic balancing.

Theft of wheel covers, and especially from the more expensive models of automobiles, has become a substantial problem.

It is therefore an important object of the present invention to provide an improved wheel structure wherein cover retaining means are provided at the terminal flange of the tire rim leaving ample room to accommodate wheel balancing weights.

Another object of the invention is to provide novel cover retaining means for the terminal flanges of automobile wheels affording a new method of balancing the wheels by the relationship of wheel balancing weights thereto.

Yet another object of the invention is to provide novel means on a tire rim for receiving in engagement therewith cover retaining means on a wheel cover.

A further object of the invention is to provide permanently welded-on cover retaining means on a tire rim for receiving self-retaining structure on wheel covers.

It is another object of the invention to provide in a wheel structure means enabling the provision of cover retaining means which will be selective and substantially at variance with respect to other cover retaining means that may be used on other wheels so as to minimize theft by precluding interchangeability of the covers.

Other objects, features and advantages of the present invention will be readily apparent from the following detailed description of certain preferred embodiments thereof taken in conjunction with the accompanying drawings in which:

Figure 1 is an outer side elevational view of a wheel structure embodying features of the invention;

Figure 2 is an enlarged fragmentary radial sectional detail view taken substantially on the line II—II of Figure 1;

Figure 3 is a fragmentary sectional detail view taken substantially on the line III—III of Figure 2;

Figure 4 is a fragmentary radial sectional view similar to Figure 2 but showing a modification;

Figure 5 is a fragmentary radial sectional view showing a further modification;

Figure 6 is a fragmentary side elevational view showing the retaining structure on the rim of Figure 5;

Figure 7 is a radial sectional detail view similar to Figure 2 but on a larger scale and showing yet another modification;

Figure 8 is a similar sectional detail view showing a further modification;

Figure 9 is a fragmentary radial sectional detail view similar to Figures 7 and 8 but showing yet another modification and taken substantially on the line IX—IX of Figure 10;

Figure 10 is a fragmentary sectional elevational detail view taken substantially on the line X—X of Figure 9 but showing the parts on a smaller scale;

Figure 11 is a fragmentary outer side elevational view of the wheel with the cover removed and showing how wheel balancing can be effected by means of a standard wheel balancing weight in association with adjacent cover retaining members carried by the terminal flange of the wheel; and Figure 12 is an outer side elevational view of the wheel with the cover removed and showing how wheel balancing is adapted to be effected in association with or relation to one of the cover retaining members serving as part of the balancing weight structure.

Referring to Figures 1, 2 and 3, a wheel cover 10 is constructed and arranged to be applied to the outer side of a vehicle wheel including a wheel body 11 supporting a multi-flange, drop center tire rim 12 which includes an intermediate generally axially outwardly extending and radailly inwardly facing flange 13 merging at its axially outer side with a generally radially outwardly extending terminal flange portion 14 terminating in a generally axially outwardly turned portion 15. A pneumatic, herein tubeless, tire 17 is adapted to be supported by the tire rim, a valve stem 18 being carried by the rim for inflating the tire.

The wheel cover 10 is adapted to be made from metal strip or sheet stock such as stainless steel or brass or the like which is adapted to be drawn and cold worked to provide the desired shape and to afford substantial resilience in especially the portions of the cover that are subject to pressures or tensions. Herein, the cover 10 includes a central crown portion 19 about which is an axially inwardly depressed or dished portion 20 joined by an annular generally axially inwardly directed or indented step-like reinforcing rib 21 to an annular outer marginal transversely axially outwardly arched rib-like annular marginal portion 22 dimensioned to overlie the terminal flange 14, 15 of the tire rim. At its outer extremity, the marginal portion 22 has a turned reinforcing and finishing edge structure 23 from which extends an underturned generally return-bent annular flange 24.

Means are provided for retaining the cover 10 in press-on, pry-off relation over the outer side of the wheel and in a manner to support the marginal portion 22, 24 of the cover in such spaced relation to the terminal flange of the tire rim as to freely accommodate wheel balancing weights therebehind in substantially concealed relation. To this end, the underturned marginal cover flange 24 extends generally radially inwardly to substantially overlie the tire rim terminal flange, and more particularly the radially extending and axially outwardly facing portion 14 thereof, with generally axially inwardly directed retaining finger extensions 25 projecting from the inner edge of the flange 24. These fingers 25 are provided with generally radially and axially outwardly oblique short and stiff retaining finger terminals 27 joined to the body portions of the respective fingers on substantially rigid axially inwardly directed reinforcing shoulder ribs 28. The length of the retaining fingers 25 between the flange 24 and the intermediate juncture shoulders 28 is such as to support the cover edge 23 in spaced adjacency to the tip of the terminal flange portion 15 when the shoulders 28 bottom or seat on the terminal flange portion 14.

Moreover, the retaining fingers 25 are disposed on a diameter just sufficiently larger than the intermediate flange 13 of the tire rim to assure engagement of the juncture shoulders 28 of the retaining fingers against the radially inner portion of the axially outwardly facing surface of the intermediate flange portion 14. Thereby, retaining engagement of the short and stiff retaining finger terminals 27 against a generally radially and axially inwardly facing shoulder or surface 29 of a retaining lug or bracket member 30 is provided for. In this instance, there are four of the members 30 disposed in circumferentially equidistantly spaced relation, one of the members being generally aligned with the valve stem 18. There are also four of the retaining fingers 25 provided by material from four corners of a quadangular sheet metal blank.

Each of the membes 30 is of substantially greater length in a circumferential direction than width in radial direction and of less or narrower width than the width of the terminal flange portion 14. At each opposite end, the member 30 is provided with a flange extension 31 of limited thickness which bears against the surface of the terminal flange portion 14 and is welded thereto as at 32. Welding is the preferred mode of attachment since that offers the least possibility of puncturing or rupturing the terminal flange portion 14 and is an expedient mass production method.

By reason of its substantial length, each of the cover retaining members 30 correspondingly has the retaining finger engageable face or shoulder 29 thereof of substantial circumferential length and preferably curved concentrically with the circumference of the wheel. As will be seen in Figure 3, the retaining finger 25 is also curved circumferentially of the wheel and is thereby substantially stiffened resiliently. The sides of the fingers 25 flare into juncture with the underturned flange 24 and thus are connected resiliently with the flange from which they are extensions. By having the finger-engageable surface 29 of the retaining member 30 at least slightly undercut, retention engagement by the retaining finger terminal 27 is enhanced. Normally the tips of the retaining finger terminals 27 extend to a slightly larger diameter than the engaged surface 29 of the retaining member 30. In the assembled relationship on the wheel, the resilient flexibility of the fingers 25 enables radially inward tensioned deflection thereof, with the resiliency of the fingers plus the resiliency of the underturned flange 24 and the marginal portion 22 of the cover assuring strong, retaining tensioned grip of the retaining finger terminals 27 against the retaining shoulder faces 29.

In order to hold the cover 10 against turning relative to the wheel and thus maintaining distortion-free registration of the valve stem 18 through a valve stem aperture 33, at least one of the retaining fingers 25 is provided with turn-preventing means. In the present instance such means comprise a pair of respective circumferentially spaced bifurcation-like projections 34 spaced apart slightly more than the spacing between the axially outwardly projecting portion of the retaining lug member 30 so as to be in opposition to the respective opposite ends of the retaining member 30 for shouldering thereagainst on any tendency of the cover to turn on the wheel as from torque or torsional forces in service.

In applying the cover 10 to the outer side of the wheel, the valve stem 18 is registered through the valve stem aperture 33. In doing so, the retaining finger 25 which is in line with such aperture engages at its terminal 27 with the retaining lug face 29. At the same time, the turn-preventing projections 34 enter into opposing relation to the ends of the body of the member 30, thereby also assisting in properly aligning the cover. Then the remainder of the cover is pushed generally axially inwardly toward the wheel so that the remaining retaining fingers 25 will enter into engagement with the remaining retaining members 30.

It will be observed that the axially outer portion of the member 30 adjacent to the undercut retaining shoulder 29 is provided with a generally radially and axially inwardly sloping lead-in surface 35 which facilitates camming in of the retaining finger terminals 27 to snap down behind and against the retaining shoulder surface 29, the tips of the terminals affording respective shoulders engaging the shoulder surface 29. When the cover has been pushed entirely home, the shoulder junctures 28 of the several retaining fingers bottom against the terminal flange portion 14 and thus serve as stops to define the axially inward disposition of the cover, and support the cover in otherwise entirely spaced relation to the outer side of the wheel, as well as assure resilient retaining tensioned interengagement of the retaining shoulders of the fingers and the retaining members. Especially behind the cover marginal portion 22 is there maintained a chamber within which wheel balancing weights are adapted to be disposed as required. Misplacement of the retainig fingers 25 between the lugs 30 and the rim terminal flange lip 15 is substantially precluded by the disposition of the radially outer sides of the lugs 30 in blocking relation to retaining reception of finger terminals.

In the chamber provided between the cover margin and the terminal flange, a standard type large size wheel balancing weight W as shown in Fig. 11 may be attached by means of a clip 75 thereon gripping the terminal flange 15. On the other hand, where advisable one or a pair of smaller size wheel balancing weights W' may be secured by means of their attachment clips 75 onto the terminal flange adjacent to one of the retaining lug members 30 as shown in Fig. 12. Since the cover retaining lugs 30 themselves are of predeterminable weight in and of themselves and are symmetrically disposed on the terminal flange, they have at least a limited wheel balancing value even in the absence of any balancing weights, as a result of flywheel-like action during rotation of the wheel and especially during high speed rotation, thereby counterbalancing minor unbalancing factors. However, where some major unbalancing factor is present determination of the point of dynamic imbalance between a pair of the retaining lugs 30 enables counterbalancing by applying the weight W between the pair of retaining lugs 30 at the opposite side of the wheel as shown in Figure 11. It will be appreciated, of course, that although the balancing weight W is shown as centered between the adjacent retaining lugs 30, it can be properly placed in adjusted position within the limits of the entire space afforded between the lugs. Of course, the nearer the balance point is to one of the adjacent retaining lugs 30, the smaller need be the weight because the weight of the retaining lug itself serves as part of the balancing weight.

With respect to Figure 12, a symmetrical arrangement of equal size balancing weights W' has been shown, assuming that the balancing center is substantially centered on the associated retaining lug 30. Where the balancing point is to either side but adjacent to the lug 30 a single proper sized weight W' may be sufficient. In any event, it will be apparent that substantial latitude or flexibility in wheel balancing is afford and the retaining lug members themselves assist in the attainment of wheel balance and will in a large number of instances minimize the size of balancing weight or weights required.

For removing the cover 10 from the outer side of the wheel, a pry-off tool such as a screwdriver or the like (not shown) may be applied behind the outer edge 23 into the gap defined thereby with the edge of the terminal flange portion 15 and between adjacent ones of the retaining lugs 30. Leverage applied to the edge 23 will at least start the cover off of the wheel. Then, as the pry-off tool is introduced further behind the cover, it makes engagement with the reinforcing rib 21 which thus serves as a pry-off shoulder radially inwardly adjacent to the retaining fingers 25. It will be observed that the shoulder 21 is disposed generally axially and radially inwardly in line with the edge 23 so that a pry-off tool can effect engagement therewith to good advantage. It will also be observed that the cover radially inwardly from the shoulder rib 21 is bowed axially outwardly so as to afford a concave relieved area inwardly adjacent to the pry-off rib to avoid damaging, denting engagement therewith by the tip of the pry-off tool as it is levered to pry the cover free from the wheel. Since the retaining finger terminals 27 are short and stiff, they slide free from the engaged retaining surfaces 29 in response to the pry-off tool force, and the cover can therefore be applied and removed an indefinite number of times.

Inasmuch as the retaining lugs 30 are disposed symmetrically and one of them is radially aligned with the valve stem 18, external visual orientation is afforded by the valve stem projecting through the cover, for applying a pry-off tool such as screwdriver behind the cover margin and directly into engagement on the ridge or top of one of the retaining lugs 30, such as the one that is nearest the valve stem. When pry-off is thus effected, substantial leverage can be effected immediately adjacent the nearest retaining finger 25 for quick disengagement thereof in response to the pry-off force. Thus, the retaining lugs 30 may serve as convenient pry-off shoulders.

In Figure 4 is shown a modification wherein details of the wheel itself are identical with details of the wheel in Figure 2 and therefore the same reference numerals have been applied. However in this form a cover 10' which is substantially the same as the cover 10, and therefore the corresponding parts are identified by similar but primed reference numerals, is retained by means of a somewhat different retaining member 37 welded to the tire rim. To this end, the member 37 has a flange portion 38 which is welded as at 39 to the inner face of the intermediate flange 13 and has a portion 40 that nests upon the juncture between the intermediate flange and the terminal flange portion 14. The portion 40 extends radially outwardly along the radially inner portion of the terminal flange section 14 and provides a seat for the juncture shoulder 28' of the retaining finger of the cover. An axially outwardly extending intermediate portion 41 of the member 37 provides a retaining-finger-terminal-engageable, slightly undercut shoulder surface which faces radially inwardly and slightly axially inwardly. At the axially outer end of the portion 41, a lead-in curved surface 42 provides juncture with a generally radially outwardly extending extremity flange 43 that is tilted toward the terminal flange portion 15 and substantially closely approaches the same so as to provide a guard against accidental insertion of the cover retaining finger 25' into the space between the retaining portion 41 and the terminal flange portion 15.

Application and removal of the cover 10' with respect to the wheel is the same as described in connection with the cover 10 except that instead of the retaining finger shoulder portions 28' engaging against the terminal flange, they engage against the portion 40 of the retaining members 37 of which there are, of course, a circumferential series, similarly as the members 30 of Figures 2 and 3.

Having reference to Figures 5 and 6, a further modification is shown wherein both the wheel and the cover are identical with the cover in Figures 1 and 2 and therefore the same reference numerals identify the same, but a somewhat different retaining member 45 is shown which similarly as the retaining member 37 is adapted to be formed from metal strip or plate stock by suitable die and press means. To this end, the member 45 comprises a base portion 47 which is engageable against the axially outwardly facing surface of the terminal flange portion 14, with a generally axially outwardly extending circumferentially arcuate portion 48 at the radially inner side of the base 47 providing a generally radially and axially inwardly directed cover retaining shoulder face that is slightly undercut or oblique similarly as the face 29 of the retaining member 30 of Figure 2. Extending generally radially outwardly and axially inwardly from the axially outer side of the portion 48 of the retaining member is a guard flange 49 at juncture of which with the portion 48 is a lead-in rounded surface 50. Preferably the flange 49 is intermediately cut out as at 51 so that clearance is provided for access with a welding electrode for spot welding of the base portion 47 at three plates 52 to the terminal flange portion 14.

Application and removal of the cover 10 with respect to the retaining members 45 is the same as described in connection with the cover 10 in Figure 2. That is, the cover is registered relative to a valve stem and the retaining fingers 25 engaged with the retaining shoulder 48 on the member 45, with turn-preventing lug projections 34 of at least one of the retaining fingers straddling the portion 48 and holding the cover against turning. Pry-off is effected the same as for the cover 10.

In Figure 7 is shown a modification wherein not only the tire rim but also the cover retaining member carried by the tire rim is identical with the tire rim 12 and cover retaining member 30 of Figure 2, and therefore similarly identified by the same reference numerals. However, a cover 55 of slightly modified construction is provided for disposition at the outer side of the wheel. This cover includes an intermediate portion 57 joining a radially outer annular arched angular cross-section marginal portion 58 having a terminal turned finishing and reinforcing edge 59 for disposition in adjacent spaced relation to the tip of the terminal flange portion 15. From the edge 59 leads an underturned generally axially outwardly and radially inwardly directed annular flange 60. At its inner margin the flange 60 has angularly turned therefrom an annular continuous axially inwardly extending flange 61 which is slightly larger in diameter than the axially outer portion of the intermediate flange 13 of the tire rim. Thereby retaining finger extensions 62 from the inner edge of the flange 61 can bear or bottom at junctures 63 with retaining terminals 64 against the radially inner portion of the terminal flange section 14.

It will be observed that the retaining finger terminals 64 extend obliquely radially and axially outwardly and are short and stiff and are engageable under resilient tension thrust of the retaining finger 62 against the retaining shoulder face 29 of the retaining member 30. At least one of the fingers 62 of which there are, of course, a circumferential spaced series, has at its opposite sides turn-preventing lug projections 65 similar in function to the lug projections 34 of the cover 10. Application and removal of the cover 55 is adapted to be effected just the same as described in connection with the cover 10.

In Figure 8, the wheel and the cover retaining means are substantially the same as shown in Figure 4 and therefore identical reference numerals identify the same. However, a cover 67 is provided which has among other things an intermediate dished portion 68 that merges with an angularly cross-sectioned but axially outwardly arched annular marginal portion 69 terminating in a turned reinforced and finished edge 70 from which extends axially outwardly and radially inwardly an underturned flange 71. At its inner side the underturned flange 71 has an axially inwardly extending continuous annular flange extension 72 which is provided at its inner terminus with a generally radially outwardly projecting continuous bead 73 which is of a diameter normally slightly greater than the diameter provided by the inner face of the retaining member portion 41 so as to be engageable under resilient gripping tension against the retaining member portion 41. For straddling in cover-turn-preventing relation the retaining portion 41 of at least one of the retaining members 37, the bead 73 is provided with a pair of turn-preventing projections 74 which function similarly to the turn-preventing projections 34 of the cover 10.

Application of the cover 67 to the outer side of the wheel is effected substantially as described in connection with the cover 10. Removal of the cover 67 may be effected by application of a pry-off tool behind the outer edge 70 thereof and then engagement of the pry-off tool behind the bead 73 which it will be noted is accessible after the tool has been applied behind the edge 70 and since the bead 73 is supported in spaced relation to the underlying terminal flange portion 14. Alternatively, the pry-off tool may be engaged behind the edge 70 and upon one of the retaining lug members 37.

In Figures 9 and 10 is shown not only a modified cover 77 but also a modified cover retaining lug structure 78, but the wheel may be substantially the same as in Figure 2 and accordingly similar reference numerals are applied to the corresponding parts of the wheel.

The cover 77 includes an intermediate annular dished portion 79 joining an outer annular arched generally angularly cross-sectioned marginal portion 80 dimensioned to overlie the tire rim terminal flange 14, 15. At its outer extremity the marginal portion 80 is provided with a turned reinforcing and finishing rib-like juncture 81 with an underturned generally radially inwardly and axially outwardly turned continuous annular flange 82. At its inner extremity the flange 82 is provided with generally axially inwardly extending retaining fingers 83 which are of substantial width and preferably obtained from four corners of a square blank and provided at their extremities with a generally axially inwardly and radially outwardly obliquely turned retaining terminal 84 provided with a return-bent relatively flattened reinforcing terminal flange 85 backed against the terminal portion 84 and arranged to make tensioned retaining gripping resilient, releasable interlocked engagement with a generally radially and axially inwardly facing generally complementary oblique retaining shoulder 87 provided by the retaining lug 78. As best seen in Figure 10, the retaining finger 83 and the retaining terminal 84, 85 are curved circumferentially so that the substantial arc on the substantial width of the finger at the terminal portion, as well as the substantial flaring tapered side juncture thereof with the underturned flange 82 assures substantial resilient stiffness in the finger. In addition, the retaining lug member 78 and more particularly in the retaining shoulder portion thereof is correspondingly circumferentially arcuate so as to afford maximum retaining frictional interengagement with the terminal shoulder flange 85 which abuts the retaining member shoulder 87 in substantially face-to-face relation.

At its inner end the undercut retaining shoulder portion 87 of the retaining member joins a generally radially extending flange portion 88 shaped on its axially inner face to fit in complementary relation against the radially extending terminal flange portion 14 and the fillet-like radius juncture with the lip flange portion 15 of the rim. At each side the base flange portion 88 of the retaining member extends beyond the remainder of the retaining member so as to afford ready access for a spot welding machine for spot welding the flange 88 to the tire rim terminal flange 14 as at 89.

At its axially outer side, the shoulder portion 87 of the retaining member 78 joins a generally radially and axially outwardly slanted lead-in flange portion 90 providing a lead-in cam surface sloping toward the axially outer side of the shoulder 87. A generally radially extending guard flange portion 91 projects beyond the outer side of the lead-in flange portion 90 in overlying relation to the base flange 88 and extends into sufficiently close proximity to the tip of the terminal flange lip 15 to avoid misapplication of the retaining finger 83 between the terminal flange lip and the retaining lug member.

To hold the cover against turning on the wheel in service, turn-preventing flanges or lugs 92 are provided on at least one of the fingers 83 in such spaced relation as to accommodate therebetween the opposite ends of the body portion of the retaining lug 78, preferably nearest a valve stem aperture in the tire rim. In this instance the turn-preventing lugs 92 are struck from the body of the retaining finger 83 between the flange 82 of the cover margin and the retaining terminal 84.

Application and removal of the cover 77 is effected similarly as application and removal of the other covers described herein, that is by aligning the cover relative to a valve stem and then pressing the cover axially home until the retaining finger terminals 84, 85 have snapped behind and into cover retaining engagement with the shoulders 87 of the respective ones of the circumferential series of retaining lugs, and with the terminals 84 seated against the tire rim terminal flange portion 14 and thus supporting the cover on the wheel in spaced relation to both the tire rim and the wheel body. Removal of the cover is effected by means of a pry-off tool inserted behind the marginal edge 81 of the cover either against the underturned flange structure of the cover or by engaging on top of one of the retaining lug flanges 91 and using that as a fulcrum levering against the cover edge 81.

All forms of the cover herein afford theft discouraging expedients since they provide retaining means which are off-size with respect to any normal portion of the wheel. That is, the retaining fingers or flange structure of the covers are not retainingly engageable with any flange of the tire rim or any part of the wheel body, but requires the special retaining means variously provided herein. Therefore, assuming that any of the retaining means of the present invention are utilized on a certain line or model of automobiles in any given model year, a substantially exclusive cover retaining arrangement can be provided which makes the covers useless for any other line or model of automobiles and thus while possibly not theft-proof, at least unattractive to wheel cover thieves. This is especially desirable with relatively expensive wheel covers such as are provided for the more expensive types of automobiles.

It will be clear, of course, that any preferred retaining finger diameter can be provided for selectivity within a reasonable range by adjustment of the diameter to which the retaining shoulders or faces of the rim-carried retaining members or lugs are predetermined. That is, for example, even if the same cover retaining expedient were to be adopted for several different lines of automobiles in any given time interval or period or model term, sufficient differences in diameter can be provided for in the disposition of the retaining shoulders or faces so that the covers for the different makes or lines or models of automobiles will not be interchangeable. On the other hand, this would be a very difficult thing to accomplish in wheels themselves which must conform to certain standards as to dimensions throughout the industry, especially in the tire rims thereof, so as to accommodate standard tire dimensions.

The several wheel covers may be used with any of the several retaining members shown herein or suggested, as preferred.

Although the wheel balancing technique has been described in connection with the form of retaining lug structure 30 in Figures 11 and 12, it should be understood that the same technique is applicable to each form of the invention disclosed. While some of the retaining lug structures may not be as heavy as others, all of them will have some balancing effect and can therefore be related to the wheel balancing weights for dynamic balancing in substantially the manner described in connection with Figures 11 and 12.

It will be understood that modifications and variations may be effected without departing from the scope of the novel concepts of the present invention.

I claim as my invention:

1. In a wheel structure a multi-flange tire rim adapted to receive a pneumatic tire and having an intermediate generally radially inwardly facing flange merging with a terminal flange including a generally radially outwardly extending portion provided at the radially outer end thereof with a generally axially outwardly extending portion, a rigid metallic cover retaining lug member having a body with a flange extension of limited thickness bearing against and secured to one of said flanges, said body overlying said radially extending terminal flange portion and projecting substantially axially outwardly beyond said flange extension, said body having thereon a generally axially inwardly and radially facing undercut-like shoulder, and a wheel cover member having resiliently flexible cover retaining terminal structure thereon engageable in press-on-off relation with said shoulder and having generally radially projecting portions disposed in the assembly in proximate opposing relation to circumferentially opposite sides of the lug body to hold the cover member against turning on the wheel, said lug flange extension projecting circumferentially under and in axial clearance relation to said projecting portions.

2. In a wheel structure a multi-flange tire rim adapted to receive a pneumatic tire and having an intermediate generally radially inwardly facing flange merging with a terminal flange including a generally radially outwardly extending portion provided at the radially outer end thereof with a generally axially outwardly extending portion, a rigid metallic cover retaining lug member having a body with a flange portion of limited thickness bearing against and secured to one of said rim flanges, said body overlying said radially extending terminal rim flange portion and projecting substantially axially outwardly beyond said lug member flange portion, said body having thereon a generally axially inwardly and radially facing undercut-like shoulder, and a cover member for disposition over the outer side of the wheel including a resiliently flexible retaining flange portion retainingly engaging said shoulder in press-on-off relation and bottomed against said lug member flange portion.

3. In a wheel structure a multi-flange tire rim adapted to receive a pneumatic tire and having an intermediate generally radially inwardly facing flange merging with a terminal flange including a generally radially outwardly extending portion provided at the radially outer end thereof with a generally axially outwardly extending portion, a rigid metallic cover retaining lug member having a body of limited width with a flange extension of limited thickness projecting circumferentially beyond at least one side of the body and bearing against and secured to said radially outwardly extending portion of the terminal flange, said body overlying said radially extending terminal flange portion and projecting substantially axially outwardly beyond said flange extension, said body having thereon a generally axially inwardly and radially facing undercut-like shoulder located axially outwardly beyond said radially extending terminal flange portion and behind which a terminal structure of a cover is engageable in press-on, pry-off relation, the sides of said body affording shoulders for opposing turn-preventing means on a cover.

4. In a wheel structure including a tire rim having a terminal flange structure provided with separately formed and rigidly secured cover retaining members affording generally axially and radially inwardly facing retaining shoulders spaced from a radially extending and axially outwardly facing portion of the terminal flange structure, a cover for disposition at the outer side of the wheel including a circular marginal portion for overlying the terminal flange and having an underturned generally radially inwardly extending flange and provided with a plurality of generally axially inwardly extending cover retaining flange resilient finger extensions each of which is provided with a cover retaining shoulder for retaining interengagement with said retaining member shoulders and a stop shoulder portion for retaining interengagement with said axially outwardly facing terminal flange portion to limit axially inward disposition of the cover and to assure resilient retaining tensioned interengagement of the shoulders of the fingers and the retaining members.

5. In a wheel structure including a terminal flange having generally radially extending and axially extending portions with an intermediate flange joining the radially inner side of the radially extending portion of the terminal flange, a plurality of rigidly secured rigid retaining members on said radially extending terminal flange portion and each provided with a generally radially and axially inwardly facing retaining shoulder spaced substantially radially inwardly from the axially extending terminal flange portion but also spaced radially outwardly relative to the intermediate flange, a cover for disposition at the outer side of the wheel including a circular marginal portion for overlying the terminal flange and having therebehind a plurality of resilient retaining finger members of substantial width and resilient stiffness and each provided with a retaining shoulder interengageable with the retaining shoulder of a respective one of the retaining members, each of said fingers having intermediately thereof and spaced axially inwardly from the retaining shoulder thereof a generally axially inwardly facing shoulder for bottoming engagement with the radially facing terminal flange portion radially inwardly from the retaining member engaged by the finger for determining the axially inward disposition of the cover and maintaining the same in spaced relation to the wheel and also assuring tensioned interengagement of the finger and retaining member shoulder.

References Cited in the file of this patent

UNITED STATES PATENTS

| | | |
|---|---|---|
| 1,954,757 | Maranville | Apr. 10, 1934 |
| 2,113,541 | Blank | Apr. 5, 1938 |
| 2,368,254 | Lyon | June 30, 1945 |
| 2,621,978 | Lyon | Dec. 16, 1952 |
| 2,624,633 | Lyon | Jan. 3, 1953 |
| 2,733,104 | Lyon | Jan. 31, 1956 |

FOREIGN PATENTS

| | | |
|---|---|---|
| 495,638 | Canada | Sept. 1, 1953 |